W. J. BALDWIN.
ART OF SEPARATING VARIOUS MATERIALS FROM GASES.
APPLICATION FILED NOV. 25, 1907.
950,607.
Patented Mar. 1, 1910.
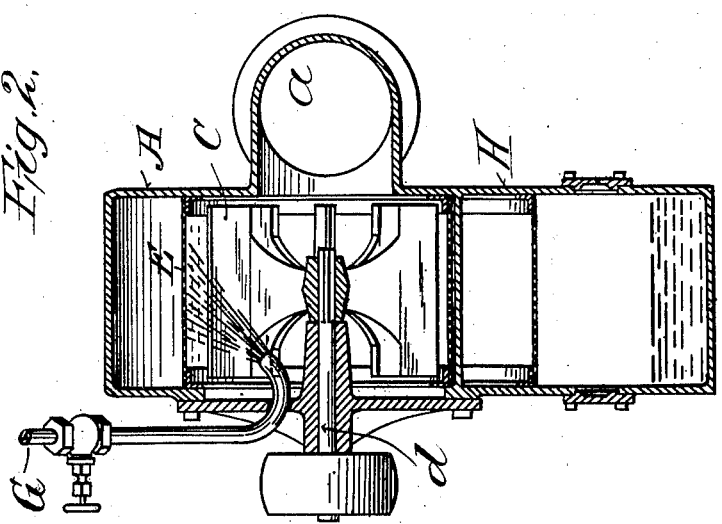
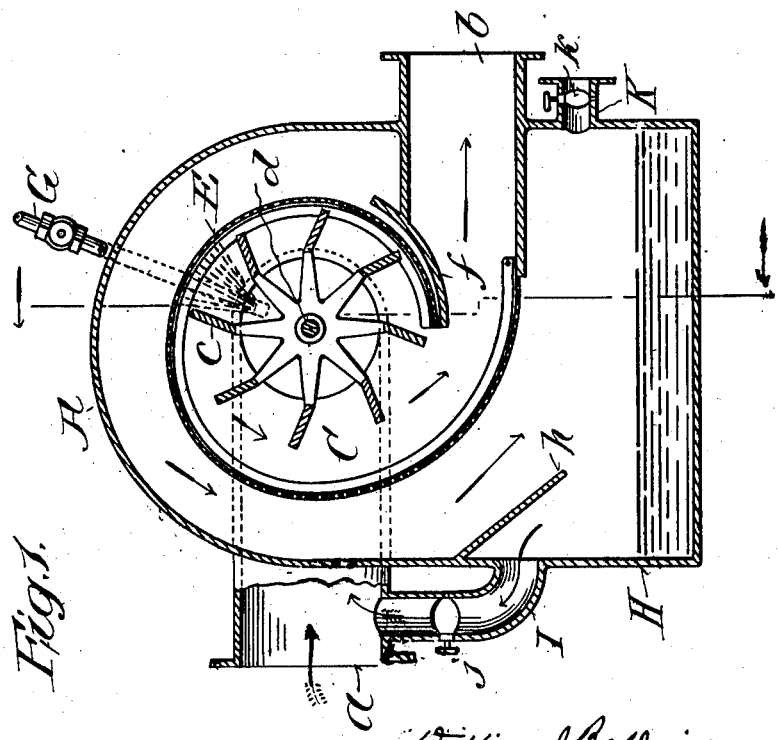
Witnesses:
William J. Baldwin Inventor

UNITED STATES PATENT OFFICE.

WILLIAM J. BALDWIN, OF NEW YORK, N. Y.

ART OF SEPARATING VARIOUS MATERIALS FROM GASES.

950,607.  Specification of Letters Patent.  Patented Mar. 1, 1910.

Application filed November 25, 1907. Serial No. 403,757.

*To all whom it may concern:*

Be it known that I, WILLIAM J. BALDWIN, a citizen of the United States of America, and a resident of the borough of Brooklyn, city and State of New York, have invented certain new and useful Improvements in the Art of Separating Various Materials from Gases, of which the following is a specification.

This invention relates to the art of separating various materials from gases.

The present application relates particularly to the process for effecting such separation, the preferred forms of apparatus for operating the said process being set forth in another of my applications, filed in the United States Patent Office on September 26, 1907, Serial Number 394,653.

The purpose of the invention is to provide a process for the separation of various materials from air and other gases, as well when said materials are condensable matters as when they are similar to particles of unconsumed carbon in smoke, dust in air, sawdust in the air of saw-mills, and the materials in gases in all other cases when their removal is desirable.

The process consists essentially in introducing into the air or other gas which contains the materials to be removed a suitable fluid, preferably in the form of spray, and including water, oil, steam, and other suitable liquids, whereby the said fluid mixing with the materials to be removed forms what I term "mud", and projecting the mud along with the gas in which the mud is contained against a separating member, such as a perforate screen, diaphragm, wall, partition or other separating member, and for sake of brevity, I hereinafter designate all such perforate screens, diaphragms, walls, partitions and separating members by the generic term "screen". Some of the mud will pass through the openings in the screen by its own momentum, and those portions of the mud which do not pass through the screen, will soon be forced through by the pressure of the gas which is projected against the screen along with the mud. Having passed through the screen, the mud drops into a suitable collector. Part of the gas will not go through the screen, but will be freed from the mud, since that has passed through, or adhered to, the screen, and this portion of the gas is removed from the space on the inner side of the screen, and is delivered to any desired place, as into a chimney, ventilator, flue, or into atmosphere, according to the requirements of the particular case. That part of the gas which passes through the screen with the mud also becomes freed from the mud, because, as hereinbefore stated, the mud drops into a suitable collector, and this portion of the gas may, if desired, be returned into the first portion which did not pass through the screen, or may be otherwise used or discharged.

Since the operation of the process is not limited to any particular form or construction of apparatus, and since, as hereinbefore stated, various forms of apparatus are set forth in my other said application, Serial Number 394,653, filed September 26, 1907, I hereinafter illustrate and describe only one form of apparatus which may be employed in the operation of the process, in order to the more clearly explain how said process may be performed.

Referring to the drawings which accompany the specification to aid the description, and which drawings illustrate the preferred form of apparatus, particularly when the process is to be applied to the preventing of smoke nuisance; Figure 1 is a vertical section of apparatus for operating the process, and Fig. 2 is a section thereof on the line 2—2 of Fig. 1.

A is a chamber provided with the inlet *a* and outlet *b*. C is a fan on a shaft *d*, which is driven from any suitable motor. E is a perforate screen, such as wire mesh relatively coarse so as to allow the largest particles to pass through, and said screen E is preferably arranged sufficiently near to said fan C to be in the path of high velocity gas, and is preferably formed on a volute as shown. A pipe G, provided with a control valve *g*, delivers water or other fluid into said case A in the vicinity of the blades *c* of said fan C, and the velocity of said fan sprays the fluid all around within the screen E and also hurls the spray against said screen. A mud collector H may be conveniently formed as the lower part of said case A, a shelf *h* being preferably employed to direct the fall of the mud into the collector away from the end of the connection I, which is preferably employed to connect the air space above the liquid and mud with the said inlet *a*, a valve *j* controlling said connection I. I also prefer to provide another outlet K from the air space within said blower case, and this will also be controlled by a suitable valve, and may be connected around into the outlet b or led to any other place as desired.

In operation, the air or gas containing the materials to be removed, as the products of combustion from a furnace, entering the case A encounters the fluid from pipe G, and the gas, materials and fluid are whirled around by the fan F, the materials being converted into mud by the fluid, and the gas and mud are projected by the centrifugal force of the whirling motion against said screen E, the very fine particles which might otherwise be impossible to separate sticking together in appreciable masses because of the fluid, and being projected through the said screen E. If any of the mud does not go through the said screen at once, it trickles down said screen and is soon forced through by the pressure of the gas. When the mud has passed through the said screen E it drops and trickles down into the collector H, and is from time to time removed through openings provided for the purpose. More or less of the gas will immediately sweep around the said screen E, and being clear of its heavy materials, which adhered to or passed through the said screen, will go by the outlet b to the chimney or other desired place. The amount of gas which passes through the said screen E is regulated by the degree to which the closures on the connections I and K are opened, and this part of the gas also becomes free from the heavy materials by the trickling and dropping of the mud into the said collector H. Any part of the gas which passed through the said diaphragm E may be delivered into the inlet a or allowed to pass out by the connection K, according to the relative opening of the closures on said connections I and K.

Assuming that the materials to be separated are of a condensable nature, such as the tarry vapors produced in the manufacture of coal gas, it will be manifest that when the said vapors enter the chamber A, they will be condensed by the entering fluid from pipe G, and projected against the screen in a viscid form which I term "mud", and the separation of the mud from the gas will then be effected in the manner hereinbefore described.

Now having described my improvements, I claim as my invention.

1. The process of separating materials from gases, which consists in mixing a fluid with the materials, projecting the mixture and the gas against a perforate screen and thereby forcing the mixture and part of the gas through the screen, removing the part of the gas which did not pass through the screen from the inner side of the screen, separating the mixture outside the screen from the gas which passed therethrough, and removing said gas from said separated mixture.

2. The process of separating materials from gases, which consists in mixing a fluid with the materials, projecting the gas and mixture against a perforate screen and thereby forcing the mixture and part of the gas through said screen, removing the part of the gas which did not pass through the screen from the inner side of the screen, separating the mixture outside of the screen from the gas which passed through the screen, and returning the gas which passed through the screen into the gas which is to be treated.

3. The process of separating materials from gases, which consists in projecting the gas containing the material against a screen, and thereby forcing the said material and part of the gas through said screen, removing the gas which did not pass through said screen from the inner side thereof, and returning the gas which passed through the screen into the gas which is to be treated.

Signed at New York city this 23rd day of November 1907.

WILLIAM J. BALDWIN.

Witnesses:
H. V. BROWN,
WALTER N. HARRIS.